(12) United States Patent
Han et al.

(10) Patent No.: US 11,237,370 B2
(45) Date of Patent: Feb. 1, 2022

(54) MULTIPLE INCLINED BEAM LINE-SCANNING IMAGING APPARATUS, METHODS, AND APPLICATIONS

(71) Applicant: University of Central Florida Research Foundation, Inc., Orlando, FL (US)

(72) Inventors: Kyu Young Han, Orlando, FL (US); Jialei Tang, Oviedo, FL (US)

(73) Assignee: UNIVERSITY OF CENTRAL FLORIDA RESEARCH FOUNDATION, INC., Orlando, FL (US)

(*) Notice: Subject to any disclaimer, the term of this patent is extended or adjusted under 35 U.S.C. 154(b) by 0 days.

(21) Appl. No.: 16/398,630

(22) Filed: Apr. 30, 2019

(65) Prior Publication Data
US 2019/0346668 A1 Nov. 14, 2019

Related U.S. Application Data

(60) Provisional application No. 62/769,976, filed on Nov. 20, 2018, provisional application No. 62/664,680, filed on Apr. 30, 2018.

(51) Int. Cl.
*G01N 21/64* (2006.01)
*G02B 21/00* (2006.01)
(Continued)

(52) U.S. Cl.
CPC ..... *G02B 21/0076* (2013.01); *G01N 21/6458* (2013.01); *G02B 21/008* (2013.01);
(Continued)

(58) Field of Classification Search
CPC ............ G02B 21/0076; G02B 21/0032; G02B 21/0036; G02B 21/0048; G02B 21/008;
(Continued)

(56) References Cited

U.S. PATENT DOCUMENTS 5,973,828 A 10/1999 Webb
8,189,937 B2 5/2012 Okugawa
(Continued)

FOREIGN PATENT DOCUMENTS

AU 2003204937 B2 7/2003
EP 1787157 B1 9/2014
(Continued)

OTHER PUBLICATIONS http://www.thorlabs.com/newgrouppage9.cfm?objectigroup_id=10766, downloaded on Feb. 10, 2021, 2 pages. (Year: 1999).*
(Continued)

*Primary Examiner* — Kiho Kim
(74) *Attorney, Agent, or Firm* — Klintworth & Rozenblat IP LLP; William Greener

(57) ABSTRACT

A dual inclined beam line-scanning confocal microscope apparatus, associated method, and applications thereof. An embodied dual-inclined beam line-scanning confocal microscope (2iLS) utilizes dual, parallel excitation beams each having a focused line shape that are scanned over a fluorescent sample. The emitted fluorescence from the sample is spatially filtered and detected by an array detector. 2iLS microscopy provides high resolution, ultrasensitivity, and deep optical sectioning capability. A reduced excitation intensity lowers photobleaching and photodamage.

12 Claims, 4 Drawing Sheets

(51) Int. Cl.
*G02B 21/36* (2006.01)
*G02B 21/02* (2006.01)

(52) U.S. Cl.
CPC ..... *G02B 21/0032* (2013.01); *G02B 21/0036* (2013.01); *G02B 21/0048* (2013.01); *G02B 21/02* (2013.01); *G02B 21/36* (2013.01)

(58) Field of Classification Search
CPC ...... G02B 21/02; G02B 21/36; G02B 21/367; G01N 21/6458
See application file for complete search history.

(56) References Cited

U.S. PATENT DOCUMENTS

| | | | |
|---|---|---|---|
| 10,567,681 B2 | 2/2020 | Beck | |
| 2003/0076587 A1 | 4/2003 | Stelzer et al. | |
| 2006/0007534 A1* | 1/2006 | Fukuyama | G02B 21/0048 359/368 |
| 2006/0256426 A1* | 11/2006 | Wolleschensky | G01N 21/6458 359/305 |
| 2007/0272885 A1* | 11/2007 | Yamashita | G02B 21/0076 250/585 |
| 2008/0285123 A1* | 11/2008 | Funk | G02B 21/002 359/388 |
| 2009/0046360 A1* | 2/2009 | Funk | G02B 21/0032 359/385 |
| 2010/0128221 A1* | 5/2010 | Muller | G02B 21/0048 351/207 |
| 2011/0002024 A1* | 1/2011 | Sheblee | G02B 21/0044 359/201.2 |
| 2011/0187878 A1 | 8/2011 | Mor et al. | |
| 2012/0257037 A1* | 10/2012 | Raicu | G02B 21/002 348/79 |
| 2012/0257038 A1* | 10/2012 | Raicu | G02B 21/16 348/79 |
| 2012/0257196 A1* | 10/2012 | Raicu | G01J 3/027 356/300 |
| 2012/0330157 A1* | 12/2012 | Mandella | G02B 26/101 600/443 |
| 2013/0093873 A1 | 4/2013 | Bula et al. | |
| 2013/0301096 A1* | 11/2013 | Takahashi | G02B 26/105 359/204.3 |
| 2014/0002608 A1* | 1/2014 | Atwell | G01B 5/008 348/46 |
| 2014/0218794 A1 | 8/2014 | Hohng et al. | |
| 2014/0232848 A1* | 8/2014 | Schwedt | G02B 21/0024 348/80 |
| 2016/0011113 A1* | 1/2016 | Muller | G02B 21/0076 250/459.1 |
| 2017/0082845 A1* | 3/2017 | Chen | G02B 21/0048 |
| 2018/0113291 A1* | 4/2018 | Kubo | G02B 21/0064 |
| 2019/0302437 A1* | 10/2019 | Hillman | G02B 21/0076 |
| 2019/0331904 A1 | 10/2019 | Han et al. | |

FOREIGN PATENT DOCUMENTS

| | | |
|---|---|---|
| EP | 3180646 B1 | 4/2020 |
| KR | 101075155 B1 | 10/2011 |

OTHER PUBLICATIONS

Baumgart, E. & Kubitscheck U. "Scanned light sheet microscopy with confocal slit detection", Optics Express, 20 21805-21814 (2012).

Brakenhoff, G. J., & Visscher, K. "Confocal imaging with bilateral scanning and array detectors". Journal of microscopy, 165 139-146. (1992).

Dwyer, P. J., DiMarzio, C. A., & Rajadhyaksha, M. "Confocal theta line-scanning microscope for imaging human tissues". Applied Optics, 46 1843-1851 (2007).

Lee, J., Miyanaga, Y., Ueda, M., & Hohng, S. "Video-Rate Confocal Microscopy for Single-Molecule Imaging in Live Cells and Super-resolution Fluorescence Imaging". Biophysical Journal, 103 1691-1697. (2012).

Mei, E., Fomitchov, P. A., Graves, R., & Campion, M. "A line scanning confocal fluorescent microscope using a CMOS rolling shutter as an adjustable aperture". Journal of microscopy, 247 269-276. (2012).

Sheppard, C. J. R., & Mao, X. Q. "Confocal Microscopes with Slit Apertures". Journal of Modern Optics, 35 1169-1185 (1988).

Tanaami, T., Otsuki, S., Tomosada, N., Kosugi, Y., Shimizu, M., & Ishida, H. "High-speed 1-frame/ms scanning confocal microscope with a microlens and Nipkow disks". Applied Optics, 41 4704-4708.(2002).

Tang, J., & Han, K. Y. "Extended field-of-view single-molecule imaging by highly inclined swept illumination". Optica, 5 1063-1069. (2018).

Vienola, K. V., Damodaran, M., Braaf, B., Vermeer, K. A., & de Boer, J. F. "Parallel line scanning ophthalmoscope for retinal imaging". Optics Letters, 40 5335-5338.(2015).

Wolleschensky, R., Zimmermann, B., & Kempe, M. "High-speed confocal fluorescence imaging with a novel line scanning microscope" Journal of Biomedical Optics, 11 064011 (2006).

Yang, Z., Mei, L., Xia, F., Luo, Q., Fu, L., & Gong, H. "Dual-slit confocal light sheet microscopy for in vivo whole-brain imaging of zebrafish" Biomedical Optics Express, 6 1797-1811 (2015).

* cited by examiner

MULTIPLE INCLINED BEAM LINE-SCANNING IMAGING APPARATUS, METHODS, AND APPLICATIONS

RELATED APPLICATION DATA

The instant application claims priority to U.S. provisional application Ser. 62/769,976 filed Nov. 20, 2018 and U.S. provisional application Ser. 62/664,680 filed Apr. 30, 2018, the subject matters of which are incorporated by reference herein in their entireties.

U.S. GOVERNMENT RIGHTS

This invention was made with U.S. Government support under Defense Advanced Research Projects Agency (DARPA) (HR00111720066) and National Science Foundation (NSF) (1805200). The Government has certain rights in this invention.

BACKGROUND

Non-limiting aspects and embodiments of the invention most generally pertain to the field of confocal microscopy; more particularly to single molecule, long-term live-cell imaging and depth-resolved biological tissue imaging. Most particularly, non-limiting aspects and embodiments are directed to a multiple inclined beam confocal fluorescence microscopy apparatus, methods, and applications thereof and most specifically to a dual inclined beam line scanning (2iLS) microscope and associated methods.

Most generally, a fluorescence microscope operates by applying excitation light to stimulate fluorescence emission from a sample object. The emitted fluorescence signal is then detected by an array detector.

Confocal laser scanning microscopy (CLSM) has greatly advanced biological imaging. A tightly focused illumination and confocal pinhole detection provide high spatial resolution and high image contrast with 3D optical sectioning. CLSM is typically operated in a fast scanning mode where a high intensity of the excitation light is illuminated on a sample during a short pixel dwell time to obtain enough photons for imaging. Nevertheless, this is not suitable for time-lapse imaging because the high excitation power results in severe photobleaching and photodamage precluding long-term imaging of live-cells. Similar issues arise in imaging weakly fluorescent samples such as single molecules because the limited number of photons from a single emitter leads to a poor signal to noise ratio (SNR) in the images. Therefore, most single molecule images have been obtained by Widefield fluorescence microscopy (e.g., TIRF; HILO).

Spinning disk microscopy has been developed to overcome these problems by utilizing a microlens array disk to generate multiple focused spots and a pinhole array disk to block the out-of-focus background. Both disks are rotated at a high speed enabling video-rate confocal imaging for live-cells with reduced photodamage. However, a low efficiency of both illumination and detection in the spinning disk system makes it challenging to be used for single-molecule imaging, although there are reports detailing this application under limited conditions. Poor optical sectioning is another drawback when imaging thick samples.

Line-scanning confocal microscopy (LS) may be a viable alternative to spinning disk microscopy. A line-shape illumination beam scans in one direction over the sample and the fluorescence signal is passed through a confocal slit and collected by array detectors. Despite a slightly poorer optical sectioning than standard CLSM, its high frame rate and low illumination intensity have allowed its use for imaging live-cells and tissues. In particular, combined with high-throughput platform, LS has been proved useful for high content cell analysis and drug screening. A scientific complementary metal-oxide semiconductor (sCMOS) camera further facilitated the use of LS, in which a rolling shutter readout with a dynamic electrical slit provided synchronization of the illumination and confocal detection without additional components. Importantly, due to the high sensitivity, LS demonstrated single-molecule-based super-resolution fluorescence imaging to reveal nanoscale structures in whole cells and 100 μm thick tissues. However, the excitation intensity of LS is >100 times higher than that of epi-fluorescence widefield microscopy (Epi), therefore photobleaching has been a concern.

Although lower intensity excitation light can be used to reduce photobleaching, its use results in reduced SNR. For imaging with pulsed excitation, a low repetition-rate has been shown to reduce photobleaching and increase total fluorescence signals. Longer interpulse time allows the relaxation of molecules from dark or triplet states. Similarly, a recent study using continuous-wave illumination showed that given the same light dose the excitation light with low excitation power and long exposure time yielded >10-fold less photobleaching compared to the one with high excitation power and short exposure time for EGFP imaging. This is likely attributed to the fact that the high instantaneous excitation intensity leads fluorophores to undergo facile photobleaching via higher excited states.

For a higher depth of imaging, highly inclined and laminated optical sheet (HILO) microscopy is known, where an incident beam refracts at a glass/water interface with an angle slightly smaller than the critical angle, yielding a thin illumination with 3D sectioning capability that enables high-contrast single molecule imaging inside of cells using a single high numerical aperture objective without the need for an additional illuminator or reflector.

The inventors have recognized the advantages and benefits of confocal fluorescence microscopy apparatus and methods that overcome the known disadvantages of conventional confocal fluorescence microscopy apparatus and techniques and further which provide improvements in speed, optical sectioning, and other desirable attributes appreciated by those skilled in the art. Such confocal fluorescence microscopy apparatus and methods are described and claimed herein below.

SUMMARY

The reader may find the following reference helpful and informative: Tang, J., & Han, K. Y., *Extended field-of-view single-molecule imaging by highly inclined swept illumination*, Optica. 5, 1063-1069 (2018), the subject matter of which is incorporated by reference to the fullest extend allowed by applicable laws and rules.

The disclosure herein below will specifically refer to dual-inclined beam line-scanning confocal microscopy, referred to herein as '2iLS.' It is to be noted, however, that multiple beams (e.g., 4, 6, 8 . . . ) could as well be employed. Although a PHOSITA will recognize that engineering challenges currently exist in implementing multiple line beam pairs, the concept validly applies.

An embodied dual-inclined beam line-scanning confocal microscope (2iLS) utilizes dual, parallel excitation beams each having a focused line shape that are scanned over a fluorescent sample. The emitted fluorescence from the sample is spatially filtered and detected by an array detector. 2iLS microscopy provides high resolution, ultrasensitivity, and deep optical sectioning capability. A reduced excitation intensity lowers photobleaching and photodamage.

Disclosed 2iLS microscopes utilize inclined illumination (typically between 30 and 50 degrees) so that the inclined line beam illuminates a larger area, effectively lowering the excitation intensity while maintaining a similar sectioning ability as conventional LS due to the off-axis illumination. Second, dual line beams are used for parallelized illumination with a typical line beam spacing of between 10 and 40 µm depending on the size of imaging area to lower the excitation intensity further. Two electrical slits are optionally provided by a 2D photodetector such as a sCMOS camera to ensure straightforward implementation. Spatial resolution and optical sectioning for the disclosed method was characterized. Disclosed dual inclined beam line-scanning imaging was found to increase the observation time more than twofold in single-molecule imaging, immunofluorescence imaging, and live-cell imaging.

An embodiment of the invention is a dual-inclined beam line-scanning (2iLS) microscope. The 2iLS microscope includes an optical train having a Cartesian z-direction optical axis, said optical train including a first optical component/assembly disposable to receive at least one collimated sample object fluorescence excitation wavelength input light beam, wherein said first optical assembly has optical characteristics suitable to transform the collimated input light beam into at least two parallel collimated output line beams oriented in an x-y plane that is orthogonal to the optical z-axis and characterized by a length, $L_y$, a width, $w_x$, and a thickness, dz; a second optical component/assembly disposable to receive the at least two parallel collimated output line beams and having optical characteristics suitable to orient the at least two parallel collimated output line beams in the x-y plane at an angle, $\theta$, with respect to the z-direction optical axis; a third optical component/assembly having optical characteristics suitable to focus the at least two parallel inclined line beams at an image plane; a fourth optical component/assembly disposed in a conjugate back focal plane of the image plane having optical characteristics suitable to sweep the at least two parallel inclined line beams along a horizontal x-axis in the image plane; and a detector/camera assembly disposable in a conjugate image plane including either a confocal slit or a functionally equivalent electrooptical confocal slit to receive a fluorescence emission from the sample object, wherein said 2iLS microscope is to be configured as a confocal, fluorescence emission microscope. In various non-limiting, exemplary embodiments and aspects the HIST microscope may have one or more of the following features, characteristics, limitations, or functions alone or in various combinations:

wherein the second optical component/assembly is a tiltable mirror;

wherein the third optical component/assembly is an objective;

wherein the fourth optical component/assembly is a galvo mirror;

wherein the detector/camera assembly is a scientific complementary metal-oxide semiconductor (sCMOS) supporting a rolling shutter mode;

further comprising a function generator that provides a trigger signal that synchronizes the beam scanning device and data acquisition by the rolling shutter camera;

wherein 70 µm≤$L_y$≤130 µM, 0.8 µM≤$w_x$≤1.2 µM, 0.8 µM≤dz≤1.2 µm;

wherein $\theta$ is between 30 to 50 degrees.

An embodiment of the invention is a method for imaging a sample object. The method includes the steps of generating at least two parallel line beams having a wavelength suitable for generating a fluorescence emission from a region of the sample object, wherein the at least two parallel line beams have a length, $L_y$, thickness, dz, and width, $w_x$, wherein $L_y$ and $w_x$ are measured in an x-y Cartesian plane and dz is measured in an orthogonal z-axis beam propagation direction; disposing the at least two parallel line beams at an angle, $\theta$, in the x-y Cartesian plane with respect to a vertical y-axis; sweeping the inclined at least two parallel line beams across a region of the sample object and generating a fluorescence emission from the sample object; propagating the fluorescence emission from the sample object to a detector comprising a functional confocal slit, wherein the at least two parallel line beams are synchronously swept with an output of the detector. In various non-limiting, exemplary embodiments and aspects the method may include one or more of the following steps, features, characteristics, limitations, or functions alone or in various combinations:

further comprising generating the at least two parallel line beams having the length, $L_y$, between 70-130 µm, the width, $w_x$, between 0.8-1.2 µm, and the thickness, dz, between 0.8-1.2 µm;

further comprising using a scientific complementary metal-oxide semiconductor (sCMOS) camera supporting a rolling shutter mode to synchronously sweep the at least two parallel line beams with the readout of the camera;

further comprising disposing the at least two parallel line beams at the inclined angle, $\theta$ equal to 30-50 degrees.

DETAILED DESCRIPTION OF NON-LIMITING EXEMPLARY EMBODIMENTS

Figure 1:
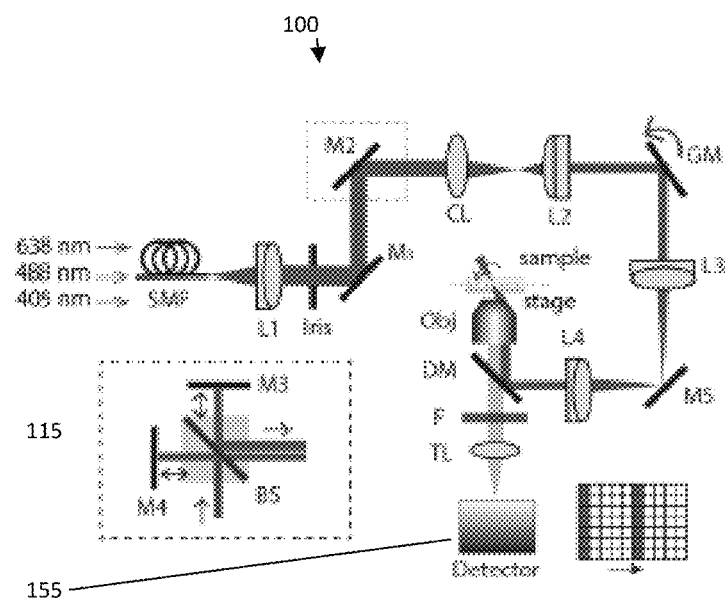
FIG. 1 shows an example 2iLS microscope, according to a disclosed embodiment.

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

A non-limiting, exemplary 2iLS microscope 100 is shown schematically in FIG. 1. As illustrated, three laser excitation inputs are shown (638 nm, 488 nm, 405 nm). They do not represent components of the 2iLS apparatus per se. In operation, the embodied 2iLS microscopy can use only a single wavelength beam; multiple wavelengths are optionally used to provide multicolor imaging. Three, four, or more different wavelengths may be utilized.

The output from the laser(s) is launched into a single mode fiber SMF. Light from the SMF is then collimated by a lens shown as L1 (e.g., f=80 mm) with a beam size controlled by an iris, which may be an adjustable iris. A dual beam output is generated by a combination of a 50:50 beam splitter (BS) 115 (Thorlabs) and two end mirrors M3 and M4 (as shown in the dotted box inset) positioned between mirror M1 and cylindrical lens CL.

Excitation line beams are generated by at least one CL (e.g., f=400 mm), relayed through a series of three achromatic lenses (L2, f=60 mm; L3, f=150 mm; L4, f=400 mm) with a 4f configuration, and sent to objective lens OBJ (UPlanSApo, 60×/1.45 oil, Olympus). A tiltable mirror (M5) was used to incline the two parallel excitation line beams from between 30-50 degrees from a Cartesian z-axis beam propagation direction (in the x-y plane). An inclination of 45 degrees was advantageous. The dual line beams were separated by between 10-40 µm depending upon the size of the imaging area. Each line beam was characterized by a length, $L_y$, along the y-axis (in a Cartesian x-y plane), a thickness, dz (along the Cartesian z-axis beam propagation direction) on the order of 1 µm (similar to that in conventional confocal line scanning), and a width, $w_x$, along the x-axis (in the Cartesian x-y plane) on the order of 1±0.2 µm (vs. around 0.3 µm in conventional confocal line scanning). A single-axis galvo mirror GM is placed at the conjugated back focal plane to scan the dual-beam excitation light over the sample.

Fluorescence emitted from the sample was collected by the same objective lens OBJ and then passed through a multi-bandpass filter (BPF) F. The fluorescence was focused onto a photodetector shown as a sCMOS camera 155 (Zyla 4.2 PLUS, Andor) by a tube lens TL (f=300 mm). The center part of the sCMOS camera 155 (1024×1024 pixel chip) was used during all experiments performed and one pixel size was ~65 nm. The camera had two electrical confocal slits, but may have 0, 1, 2 electrical slits. The images presented were 2×2 binned after image acquisition. A typical imaging depth is 10 to 100 µm. A piezo stage was used for holding the sample and acquiring z-stack images. An analog output board (PCI-6733, National Instruments) generates a master trigger signal that synchronizes the sCMOS camera 155, the GM, and the piezo stage.

The inventors used simultaneous scan down readout mode in the sCMOS camera 155 to selectively detect fluorescent signals from the two regions excited by the dual inclined line beams. The respective lasers were turned off between each frame to minimize photobleaching.

Examples and Discussion

Disclosed embodiments of the invention are further illustrated by the following specific Examples, which should not be construed as limiting the scope or content of this Disclosure in any way.

Illumination Profiles

The inventors investigated illumination profiles of inclined line scanning confocal microscopy (iLS) using the scalar Debye diffraction integral, which was previously used to describe a 3D point spread function (PSF) of line-scanning confocal microscopy for a high numerical aperture objective lens. The excitation amplitude ($h_{ex}$) of the line illumination where the line is parallel to the y-axis is represented as:

$$h_{ex}(x,z) = \int_{-\alpha}^{\alpha} \sqrt{\cos\theta}\exp(-ik_{ex}x\sin\theta)\exp(-ik_{ex}z\cos\theta)k_{ex}\cos\theta d\theta. \quad (1)$$

where α is the half aperture angle of the objective and $k_{ex}(=2\pi n/\lambda_{ex})$ is the wave number of the excitation light with a wavelength of $\lambda_{ex}$. The inventors assumed that a refractive index of the medium (n) was 1.518, the excitation wavelength was 638 nm and the numerical aperture (NA) of objective was 1.45.

Figure 2:
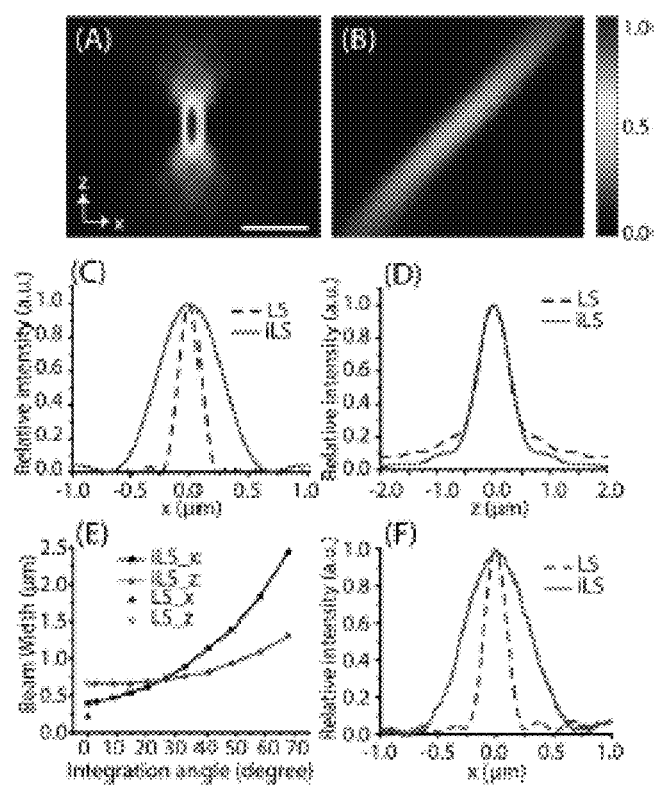
FIG. 2 shows a comparison of the excitation illumination profiles for LS and iLS. Simulated excitation PSF of LS (a) and iLS (b) in the xz-plane. Scale bar, 1 µm; (c, d) Simulated line profiles along the x-axis (c) and z-axis (d); (e) Integration angle ($\theta$) dependent changes of the lateral and axial widths for iLS; (f) Experimentally measured beam profiles using gold nanoparticles.

For conventional LS illumination, the inventors calculated the excitation PSF defined by $|h_{ex}|^2$ as shown in FIG. 2(a). The inventors integrated the equation (1) from $-\alpha_m$ to $\alpha_m$, where $\alpha_m$ is the maximum value of α with the objective, that is 72.8°. To generate iLS illumination, the inventors integrated the equation (1) from θ to $\alpha_m$, where θ ranges from 0 to $\alpha_m$. While the lateral distribution of iLS becomes broader, the FWHM of iLS along the z-axis is almost same as LS. For example, when θ=26°, the excitation PSF of iLS is displayed in FIG. 2(b). In this case, the calculated beam widths of iLS were 3.27 times wider along the x-axis [FIG.

2(c)] but just 1.05 times larger along the z-axis compared to LS [FIG. 2(d)]. Note that iLS shows a lower residual intensity along the z-axis. In order to estimate an optimal value of θ, the inventors measured the lateral and axial FWHMs at different angles [FIG. 2(e)]. When the angle is larger than 26°, the axial profile of iLS becomes much larger than that of LS, thus θ≈26° was chosen as an optimal angle.

The inventors experimentally measured the illumination profile by scanning 80 nm gold nanoparticles at an excitation wavelength of 638 nm. A confocal slit was not used for this measurement. For LS illumination, the inventors used a line-shaped beam whose length, L, at the back focal plane was slightly larger than the pupil size of the objective to ensure overfilling. In contrast, for iLS illumination, the inventors generated a line profile with a length, L, of ≈2.4 mm at the back focal plane by adjusting the beam size with an iris. Then the center of the beam was shifted to off-axis at the pupil plane to obtain inclined illumination via tuning the mirror (M5). After averaging the pixel intensities along the y-axis, the inventors obtained line profiles as shown in FIG. 2(f). The line width of iLS was ~3.0-times wider than that of LS and this corresponded well with our theoretical results.

Optical Resolution of Inclined Line-Scanning Microscopy

Figure 3:
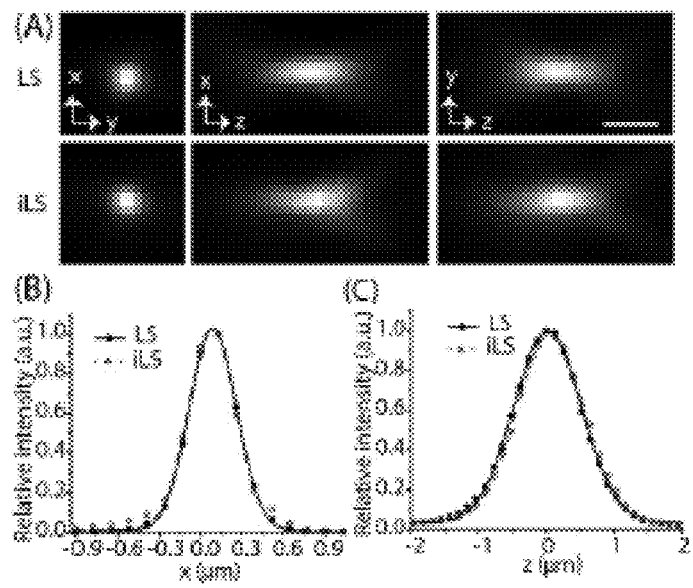
FIG. 3 shows experimental measurements of the effective PSF. (a) Fluorescence images of 200 nm beads measured by LS and iLS microscopy in xy, xz and yz planes. Scale bars, 1 µm; (b, c) Lateral and axial line profiles. More than 50 spots were averaged.

The inventors measured the effective PSF using 200 nm fluorescent beads with a confocal slit (FIG. 3a). A rolling shutter width of the sCMOS camera was set based on the measured profiles of the excitation beam in FIG. 2(f), which was 14 pixels and 30 pixels for LS and iLS imaging. Here we used a slightly larger slit width than 1 Airy unit to collect more photons, although reducing the slit size helps the background rejection.

Once 3D bead images were taken, the FWHMs were measured in the lateral and axial directions [FIGS. 3(b) and (c)]. With an inverse deconvolution using the size of beads, we obtained the corrected PSFs. The FWHMs of LS in the x- and z-axis were 316.3±6.3 nm and 1.09±0.02 μm, whereas the FWHMs of iLS were 320.1±5.4 nm and 1.12±0.02 μm (mean±s.e.m. from >20 beads). The FWHM along the y-axis was 1.1-times larger than that along the x-axis. As expected, the optical resolutions of both approaches were almost same.

Optical Sectioning of Inclined Line-Scanning Microscopy

Figure 4:
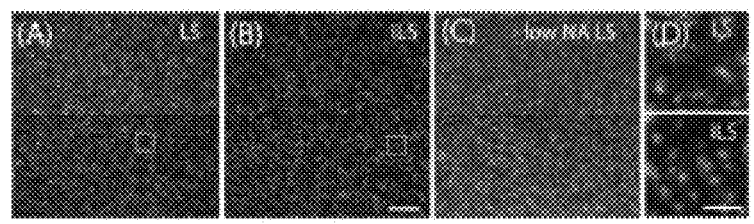
FIG. 4. Single-molecule imaging in 3D hydrogel by LS (a), iLS (b), and low NA LS (c); (d) Zoomed-in areas in (a) (top) and (b) (bottom). Scale bars, 10 µm (c) and 2 µm (d).

To compare the sectioning capability of iLS with conventional LS microscopy, we imaged 3D single-molecule hydrogel samples. Single DNA probes labelled with Atto 647N were linked to the hydrogel network. Z-stack images from an imaging depth of 5 μm to 8 μm were recorded with 0.25 μm per step and are shown in FIG. 4 after the maximum intensity projection. An imaging buffer composed of oxygen scavenger system and Trolox was used to increase the photostability. We calculated the SNR from more than 100 independent single-molecule spots, of which the noise mainly originated from the out-of-focus background and was calculated similarly to a previous study by the inventors (id.). For additional comparison, we imaged the hydrogel using the conventional line illumination but with a low excitation NA (~1.0). This beam had ~2.5 times smaller in the lateral distribution but ~2.3 times larger in the axial distribution than iLS. FIG. 4 clearly shows that iLS microscopy could effectively reject out-of-focus background due to the inclined illumination even with a wider excitation profile and confocal slit. However, images from low NA line-scanning illumination displayed higher background. The SNRs of iLS, LS and low NA LS were 4.3±1.3, 4.2±1.3 and 2.8±0.9, while an Epi illumination was not able to provide discernable single-molecule images in this case. Notably, iLS has a comparable sectioning capability to LS but it uses 3.0-fold lower excitation intensity, discussed further herein below.

smFISH Imaging by Inclined Line-Scanning Microscopy

To demonstrate that iLS microscopy can be used for high contrast single-molecule imaging in cells, we conducted single-molecule fluorescence in situ hybridization (smFISH) experiments against human GAPDH RNA in U2OS cells (human bone osteosarcoma). Generally, smFISH uses multiple probes (a minimum of 20 probes) for reliable detection of RNA. However, if there is no severe nonspecific binding, it is possible to use a few probes or even a single probe to detect each RNA as demonstrated previously. To highlight single-molecule sensitivity and high SNR of the disclosed method we used a single probe labeled with AlexaFluor 647 (AF647).

Figure 5:
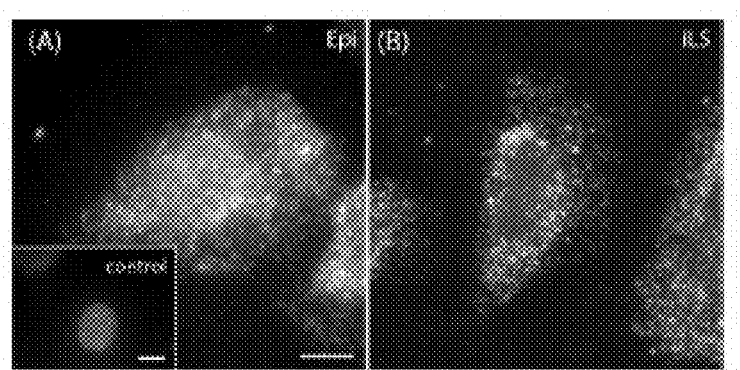
FIG. 5 shows single probe smFISH images of U2OS cells measured by Epi (a) and iLS microscopy (b). The excitation intensity and the exposure time of Epi imaging were 150 W/cm$^2$ and 400 ms; (c) Control experiment with 0.5% RNase treatment. Maximum intensity projection was performed from the surface to z=5 µm (20 images). Cells were fixed with 4% (v/v) paraformaldehyde. DAPI stain is in blue. Scale bar, 10 µm.

FIG. 5 shows smFISH images taken with Epi and iLS microscopy. Due to the autofluorescence and the high density of target RNAs, it was hard to discern each individual spot with epi-illumination [FIG. 5(a)]. However, iLS imaging enabled us to obtain a much clearer image as shown in FIG. 5(b). Both methods used the same light dose. The excitation intensity and the pixel dwell time of iLS imaging were 10 kW/cm$^2$ and 6 ms. We confirmed that these spots indeed resulted from a specific binding of the probe to the target RNA by performing a control experiment treated with RNase [FIG. 5(c)].

Dual Inclined Beam Illumination

Figure 6:
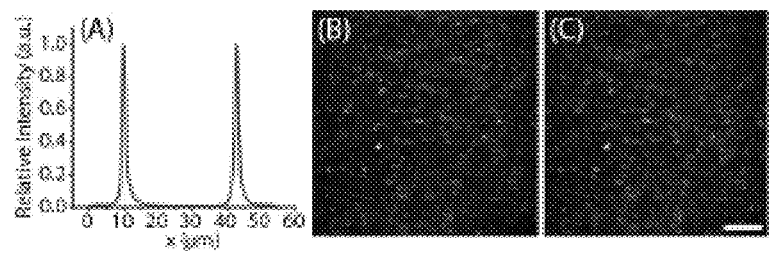
FIG. 6 illustrates dual inclined line-scanning microscopy. (a) Illumination profiles of dual inclined beams measured using a thin dye layer. Fluorescence images of 200 nm beads measured at an imaging depth of 5 µm with iLS (b) and 2iLS (c). The frame rates were 2.5 fps and 5 fps, respectively. Scale bar, 10 µm.

To further decrease the excitation intensity, we generated two line profiles with an inclined illumination (2iLS) as described herein above. These lines were separated by half the width (D) of FOV (~32.5 μm) and each line had the same intensity [FIG. 6(a)]. The fluorescence emission from these lines was spatially filtered with two electrical slits of the sCMOS camera 155. The large separation between two lines prevented crosstalk between the slits. Since each beam only needs to scan over D/2, it is possible to increase the dwell time by two-fold but decrease the excitation intensity accordingly. We imaged densely packed 200 nm fluorescent beads in 3D hydrogel gel by iLS and 2iLS microscopy [FIGS. 6(b) and (c)]. In this case, we used the same excitation intensity and dwell time but the frame rate of 2iLS was doubled. The measured SNRs of both approaches were very similar, i.e. 4.8±2.5 and 4.7±2.6 for iLS and 2iLS.

Photobleaching

Figure 7:
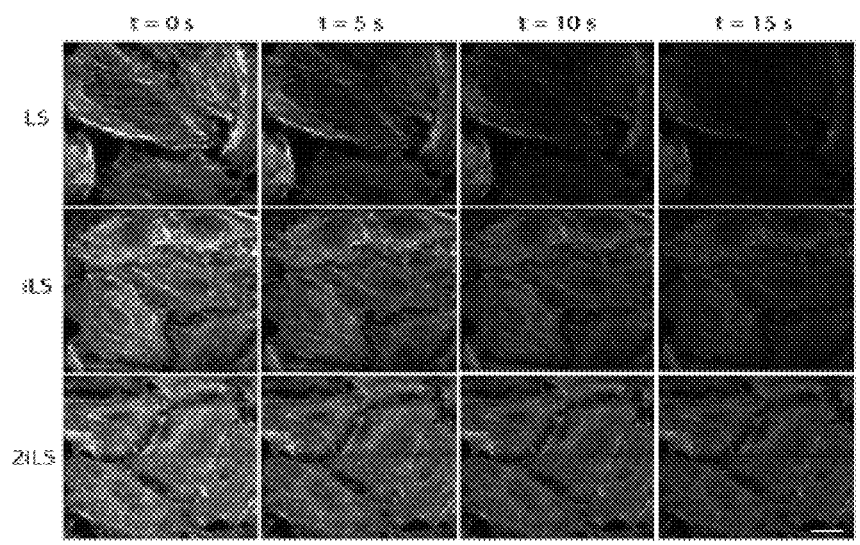
FIG. 7 shows time-lapsed imaging of A549 cells with different LS imaging methods. Actin was stained with AF647. The camera frame rate was 5 Hz and the illumination dose was 9.5 J/cm$^2$ per frame. Scale bar, 10 µm.

We demonstrated that the disclosed imaging method effectively reduced photobleaching. Since every fluorophore has different photobleaching response upon the high excitation intensity, we tested three fluorophores, AF647, Atto 647N and GFP. First, we imaged actin labeled with AF647 phalloidin in fixed A549 cells. A Prolong Diamond Antifade reagent was used as mounting media. We obtained time-lapse images using LS, iLS and 2iLS microscopy with the same light dose and the same frame rate. FIG. 7 shows that 2iLS imaging has less photobleaching over time compared to other imaging methods. The intensity time traces were fitted with a single exponential decay function [FIG. 8(a)] and it showed that the photobleaching time of 2iLS was 2.2-times longer than LS. A log-log plot of the fluorescence decay rate versus the excitation intensity gave a slope of 0.44±0.07 [FIG. 8(a) inset], demonstrating that a low excitation intensity and a long dwell time are beneficial to mitigate photobleaching.

Figure 8:
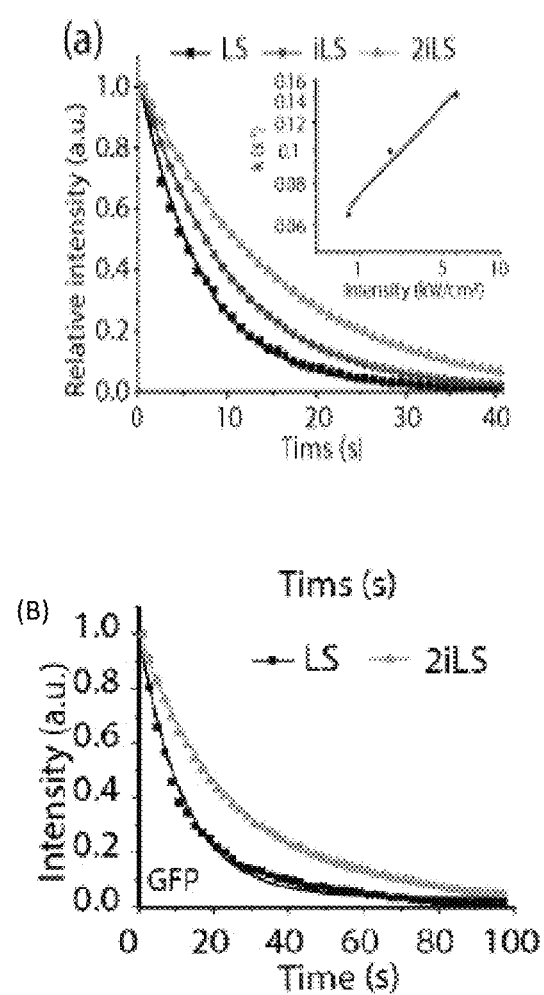
FIG. 8 shows photobleaching analysis. (a) Photobleaching time of AF647 stained actin in A549 cells. Solid lines are exponential decay fits of each photobleaching data, indicating a photobleaching time of 6.9±0.1 s for LS, 10.1±0.1 s for iLS and 15.5±0.1 s for 2iLS. Inset is a log-log plot of the photobleaching rate (k) with respect to illumination intensity. A red curve is a linear fit; (b) Photobleaching time traces of tubulin-GFP in live U2OS cells.

Similarly, 2iLS imaging increased the observation time of single-molecule Atto 647N by 2.3-fold compared to LS imaging in the presence of an imaging buffer. We also performed photobleaching experiments on live U2OS cells expressing tubulin-GFP. With an illumination power of 3 mW, the measured photobleaching times of LS and 2iLS were 12.4±1.3 s and 21.7±1.0 s (n=5) as shown in FIG. 8C.

In conclusion, spinning disk microscopy has been considered as an ideal approach for fast live-cell imaging. However, it turns out that it is not suitable for single-molecule imaging and tissue imaging. Rather, line-scanning confocal microscopy can improve the frame rate by scanning a line while maintaining a modest optical sectioning. It is also applicable to single-molecule imaging. Nevertheless, LS imaging has been suffered from higher photobleaching rates than wide-field fluorescence microscopy due to the high excitation intensity.

Per the embodied invention we have demonstrated that LS microscopy employing dual inclined beams (2iLS) allowed >2-times longer observation of fluorescent molecules. 2iLS showed the same sectioning capability as conventional LS microscopy and exhibited similar spatial resolution. A reduced excitation intensity and increased dwell time mitigates photobleaching under the same light dose. The low excitation intensity may be advantageous to prevent saturated excitation of fluorescence. It is possible to reduce the photobleaching further using many parallel excitation lines, and other fluorophores will have the benefit of the disclosed approach. The inventors expect the disclosed 2iLS microscopy will be useful for many applications including tissue imaging and high-throughput imaging with high speed, high sensitivity and low photobleaching. The disclosed 2iLS microscope is expected to be a powerful method for single-molecule imaging that demands high contrast in thick samples.

Finally, the inventors note that the instant embodied 2iLS microscope has many common features with the HIST microscope described in concurrently filed and copending application Ser. No. 16/398,463 entitled HIGHLY INCLINED SWEPT TILE (HIST) IMAGING APPARATUS, METHODS, AND APPLICATIONS. The primary structural differences are the optics for creating dual line beams instead of a single tile beam and the use of two cylindrical lenses instead of a single cylindrical lens. Each microscope and associated imaging method have advantages depending upon the imaging application. As such, a combination HIST/2iLS microscope is feasible with some interchangeable optical components as a person skilled in the art would understand.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

We claim:

1. A dual-inclined beam line-scanning (2iLS) microscope, comprising:
    an optical train having a Cartesian z-direction optical axis, said optical train including a first optical component/assembly disposable to receive at least one collimated sample object fluorescence excitation wavelength input light beam, wherein said first optical assembly has optical characteristics suitable to transform the collimated input light beam into at least two parallel collimated output line beams oriented in an x-y plane that is orthogonal to the optical z-axis and characterized by a length, $L_y$, a width, $w_x$, and a thickness, dz;
    a second optical component/assembly disposable to receive the at least two parallel collimated output line beams and having optical characteristics suitable to orient the at least two parallel collimated output line beams in the x-y plane at an angle, $\theta$, with respect to the optical z-axis;
    a third optical component/assembly having optical characteristics suitable to focus the at least two parallel inclined line beams at an image plane;
    a fourth optical component/assembly disposed in a conjugate back focal plane of the image plane having optical characteristics suitable to sweep the at least two parallel inclined line beams along a horizontal x-axis in the image plane; and
    a detector/camera assembly disposable in a conjugate image plane including either a confocal slit or a functionally equivalent electrooptical confocal slit to receive a fluorescence emission from the sample object,
    wherein said 2iLS microscope is to be configured as a confocal, fluorescence emission microscope.

2. The 2iLS microscope of claim 1, wherein the second optical component/assembly is a tiltable mirror.

3. The 2iLS microscope of claim 1, wherein the third optical component/assembly is an objective.

4. The 2iLS microscope of claim 1, wherein the fourth optical component/assembly is a galvo mirror.

5. The 2iLS microscope of claim 1, wherein the detector/camera assembly is a scientific complementary metal-oxide semiconductor (sCMOS) supporting a rolling shutter mode.

6. The 2iLS microscope of claim 5, further comprising a function generator that provides a trigger signal that synchronizes the beam scanning device and data acquisition by the rolling shutter camera.

7. The 2iLS microscope of claim 1, wherein 70 µm<$L_y$<130 µm, 0.8 µm<$w_x$<1.2 µm, 0.8 µm<dz<1.2 µm.

8. The 2iLS microscope of claim 1, wherein $\theta$ is between 30 to 50 degrees.

9. A method for imaging a sample object, comprising:
    generating at least two parallel line beams having a wavelength suitable for generating a fluorescence emission from a region of the sample object, wherein the at least two parallel line beams have a length, $L_y$, thickness, dz, and width, $w_x$, wherein $L_y$ and $w_x$ are measured in an x-y Cartesian plane and dz is measured in an orthogonal z-axis beam propagation direction;
    disposing the at least two parallel line beams at an angle, $\theta$, in the x-y Cartesian plane with respect to the z-axis beam propagation direction;
    sweeping the inclined at least two parallel line beams across a region of the sample object and generating a fluorescence emission from the sample object;
    propagating the fluorescence emission from the sample object to a detector comprising a functional confocal slit, wherein the at least two parallel line beams are synchronously swept with an output of the detector.

10. The method of claim 9, further comprising generating the at least two parallel line beams having the length, $L_y$, between 70-130 µm, the width, $w_x$, between 0.8-1.2 µm, and the thickness, dz, between 0.8-1.2 µm.

11. The method of claim 9, further comprising using a scientific complementary metal-oxide semiconductor (sCMOS) camera supporting a rolling shutter mode to synchronously sweep the at least two parallel line beams with the readout of the camera.

12. The method of claim 9, further comprising disposing the at least two parallel line beams at the inclined angle, $\theta$ equal to 30-50 degrees.

\* \* \* \* \*